United States Patent [19]

Bailey

[11] Patent Number: 5,705,747

[45] Date of Patent: Jan. 6, 1998

[54] METHODS AND SYSTEM FOR SCALEABLE LIQUID DISPLAY AND CONTROL

[75] Inventor: Michael R. Bailey, Bowling Green, Ohio

[73] Assignee: Henry Filters, Inc., Bowling Green, Ohio

[21] Appl. No.: 818,291

[22] Filed: Mar. 14, 1997

Related U.S. Application Data

[63] Continuation of Ser. No. 372,580, Jan. 13, 1995, abandoned.

[51] Int. Cl.$^6$ .............................. G01F 23/00; G08B 25/00
[52] U.S. Cl. ...................... 73/290 R; 340/525; 345/140
[58] Field of Search ...................... 73/290 R; 340/461, 340/462, 525; 345/33, 34, 35, 46, 83, 3, 5, 104, 140

[56] References Cited

U.S. PATENT DOCUMENTS

| | | | |
|---|---|---|---|
| 3,548,657 | 12/1970 | Panerai et al. | 73/293 |
| 4,197,650 | 4/1980 | Bailey et al. | 345/35 X |
| 4,461,175 | 7/1984 | Baumgart et al. | 340/618 X |
| 4,612,949 | 9/1986 | Henson | 137/2 |
| 4,622,548 | 11/1986 | Andres et al. | 73/492 X |
| 4,649,387 | 3/1987 | Maris | 73/147 X |
| 4,692,760 | 9/1987 | Unno et al. | 345/3 X |
| 4,745,543 | 5/1988 | Michener et al. | 345/140 X |
| 4,780,705 | 10/1988 | Beane | 340/620 |
| 4,788,539 | 11/1988 | Frey | 345/35 X |
| 4,847,785 | 7/1989 | Stephens | 345/140 X |
| 4,987,776 | 1/1991 | Koon | 340/612 |
| 5,141,061 | 8/1992 | Henneuse | 73/151 X |
| 5,159,318 | 10/1992 | Kronberg | 340/622 |
| 5,207,251 | 5/1993 | Cooks | 73/299 |
| 5,210,769 | 5/1993 | Seidel et al. | 73/295 |
| 5,258,753 | 11/1993 | Jonker et al. | 345/140 X |
| 5,261,276 | 11/1993 | Gifford | 73/299 |
| 5,271,045 | 12/1993 | Scarola et al. | 340/525 X |
| 5,289,846 | 3/1994 | Elias et al. | 340/620 |

*Primary Examiner*—Ronald L. Biegel
*Assistant Examiner*—Paul D. Amrozowicz
*Attorney, Agent, or Firm*—Brooks & Kushman P.C.

[57] ABSTRACT

Methods and systems for displaying a level of a liquid contained in a tank are disclosed, wherein the level of the liquid is measured using a sensing device. An embodiment of a system includes a user interface, a processor, and a display. The user interface allows a plurality of parameters, including a lower display level and an upper display level, to be modified. The processor communicates with the sensing device and the user interface to scale the level in dependence upon the lower display level and the upper display level. The display communicates with the processor to graphically display the level of the liquid scaled in dependence upon the lower display level and the upper display level.

16 Claims, 12 Drawing Sheets

METHODS AND SYSTEM FOR SCALEABLE LIQUID DISPLAY AND CONTROL

This is a continuation of application Ser. No. 08/372,580 filed on Jan. 13, 1995, now abandoned.

TECHNICAL FIELD

The present invention relates to methods and systems for displaying a level of a liquid contained in a tank, and methods and systems for controlling a level of a liquid contained in a tank.

BACKGROUND ART

Many systems are currently available to provide a display of the level of a liquid contained within a tank. U.S. Pat. No. 3,548,657 to Panerai et al. discloses a system which provides a vertical bar display representative of the level of the liquid using a specific optical light-transmitting sensing device. The sensing device includes a plurality of optical reflection prisms simultaneously and uniformly illuminated by a luminous source located on one wall of the tank. The system further includes a plurality of photosensors, one photosensor for each of the prisms, capable of detecting which of the prisms are intercepted by liquid contained within the tank. The photocells are coupled to one or more lamps which provides a fixed, vertical bar display of the liquid contained within the tank.

U.S. Pat. No. 4,987,776 to Koon discloses a level indicator having a plurality of sensors which sense the presence of liquid relatively adjacent thereto, and level indicating means which light-up one more lights based upon signals produced by the sensors. In particular, the lights are lit so as to indicate whether a storage compartment is full, partially full, or empty, as the case may be. The ranges of the level indication are fixed, and as such cannot be modified by the user.

U.S. Pat. No. 4,780,705 to Beane discloses an overfill sensing system comprising sensor overfill indication means responsive to a sensor. The sensor overfill indication means visually indicates when the liquid within a container has reached the sensor means. The sensor overfill indication means is in the form of light-emitting diodes which are turned on when a positive sensor signal is received. As with the above-mentioned systems, the scale of the display is fixed.

SUMMARY OF THE INVENTION

It is thus an object of the present invention to provide a scaleable display for the level of a liquid contained in a tank.

A further object is to graphically display set points used to regulate the level of the liquid.

It is another object to provide a scaleable display range which increases the display sensitivity as compared to a fixed display range.

In carrying out the above objects and other objects, the present invention provides a system for displaying a level of a liquid contained in a tank, wherein the level of the liquid is measured using a sensing device. The system comprises a user interface, a processor, and a display. The user interface allows a plurality of parameters, including a lower display level and an upper display level, to be modified. The processor, which communicates with the sensing device and the user interface, scales the level in dependence upon the lower display level and the upper display level. The display, which communicates with the processor, graphically displays the level of the liquid scaled in dependence upon the lower display level and the upper display level.

Further in carrying out the above objects, the present invention provides a method for displaying a level of a liquid contained in a tank. The method comprises a step of modifying at least one of a plurality of display parameters, wherein the display parameters include a lower display level and an upper display level. The method further comprises a step of graphically displaying the level of the liquid scaled in dependence upon the lower display level and the upper display level.

These and other features, aspects, and advantages of the present invention will become better understood with regard to the following description, appended claims, and accompanying drawings.

BRIEF DESCRIPTION OF THE DRAWINGS

FIG. 7(a–c) is a schematic drawing of an embodiment of a system in accordance with the present invention; and FIG. 8(a–d) is a schematic drawing of an embodiment of a display in accordance with the present invention.

BEST MODES FOR CARRYING OUT THE INVENTION

Figure 1:
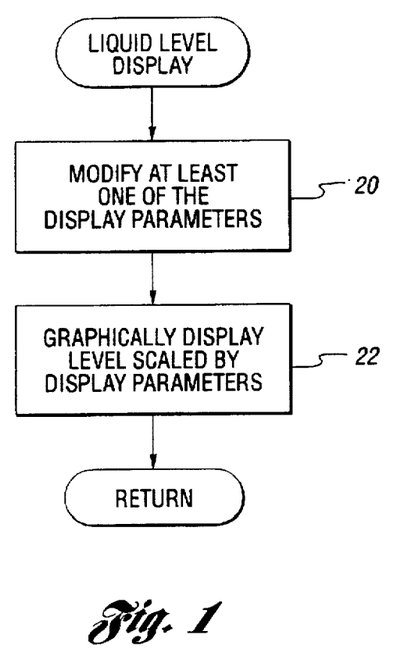
FIG. 1 is a flow chart of an embodiment of a method of displaying a level of a liquid contained within a tank.

FIG. 1 is a flow chart of an embodiment of a method of displaying a level of a liquid contained in a tank. The method utilizes a sensing device which senses the level of the liquid within the tank. The method includes a step of modifying at least one of a plurality of display parameters, as indicated by block 20. The display parameters include a lower display level and an upper display level. The lower display level and the upper display level define bounds between which the level of the liquid is displayed. The method further includes a step of graphically displaying the level of the liquid scaled in dependence upon the lower display level and the upper display level. Preferably, the level of the liquid is scaled using a linear interpolation scheme based upon the lower display level and the upper display level.

Figure 2:
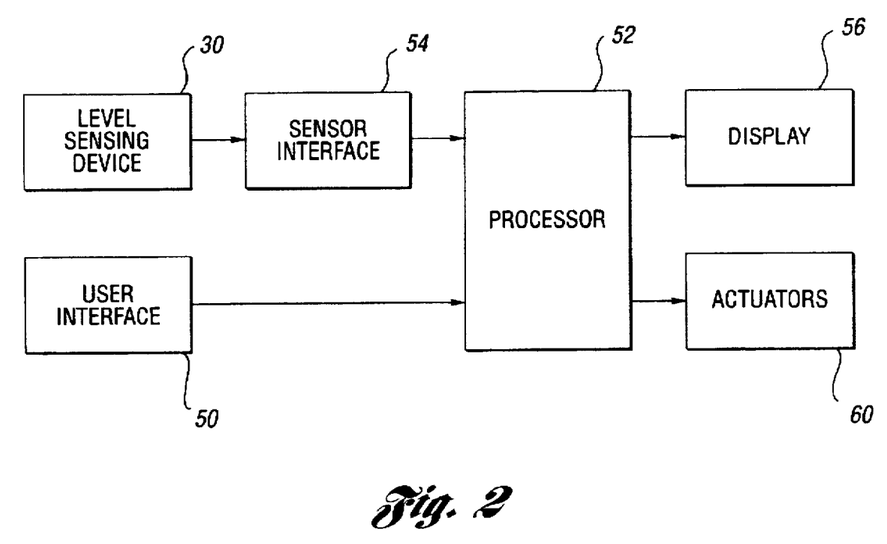
FIG. 2 is a block diagram of an embodiment of a system for displaying a level of a liquid contained within the tank.
Figure 3:
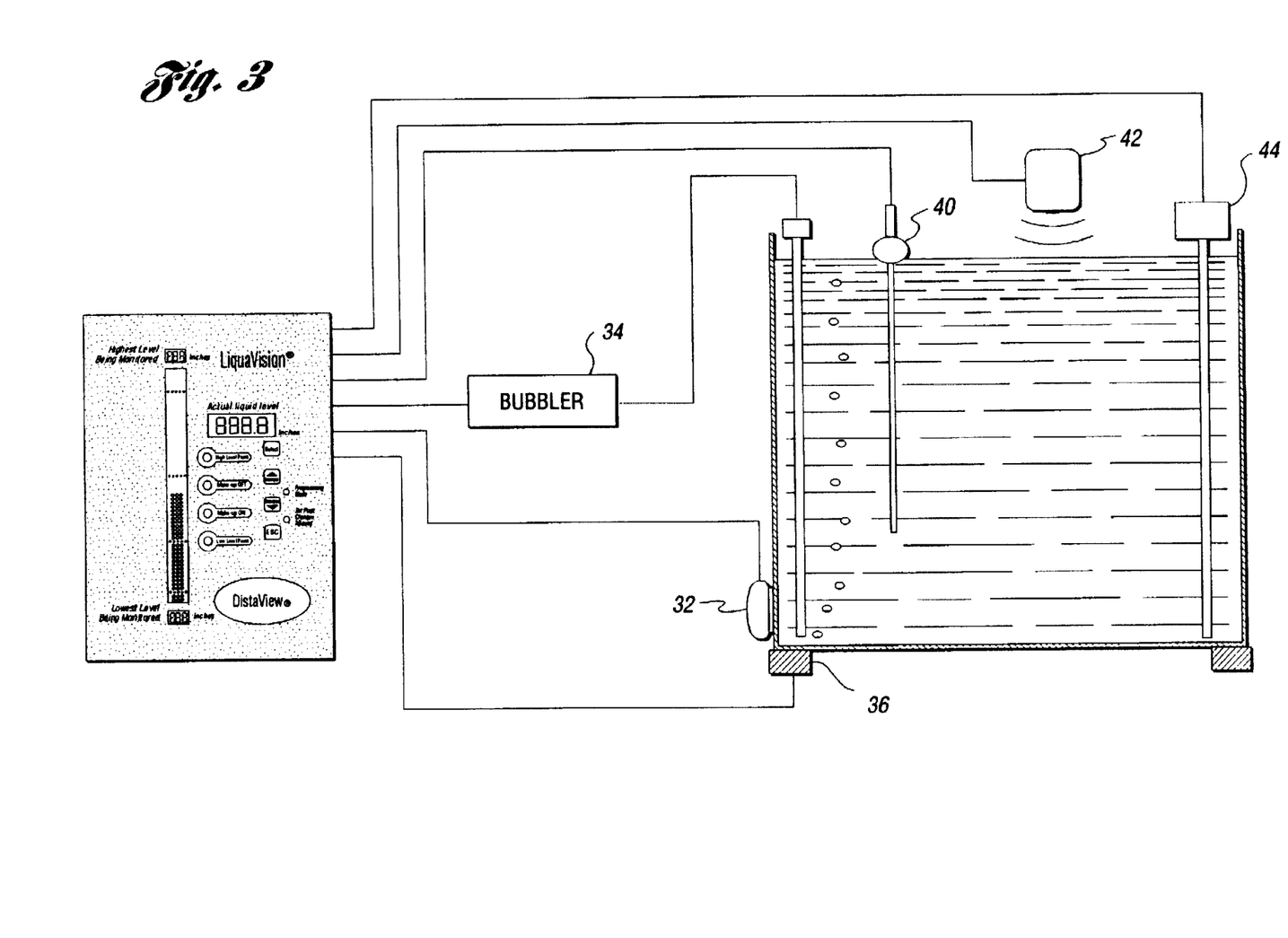
FIG. 3 is an illustration of various types of sensing devices which can be used in embodiments of the present invention.

FIG. 2 is a block diagram of an embodiment of a system for displaying a level of a liquid contained in a tank. The system is designed for use with a sensing device 30 which measures the level of the liquid contained in the tank. As illustrated in FIG. 3, examples of alternative sensing devices 30 include a pressure sensor 32, a bubbler 34, a weight sensor 36, a float ball 40, and an ultrasonic sensor 42. Hence, the sensing device 30 can either make a direct measurement of the level, as would be performed by the float ball 40 or the ultrasonic sensor 42, or indirectly measure the level by a related measurement, such as would be performed by the pressure sensor 32, the bubbler 34, or the weight sensor 36.

The aforementioned alternative sensing devices should not be construed as a limitation for the different types of sensing devices which can be employed in embodiments of the present invention.

In a preferred embodiment, the sensing device 30 employs the pressure sensor 32 or the bubbler 34 with a built-in pressure sensor. The bubbler 34 flows a gas, such as air, into a tube into the tank, and the back pressure of the gas against the water level is measured. As the level is raised, the back pressure increases. Consequently, the level can be determined by the pressure.

Referring back to FIG. 2, the system comprises a user interface 50 which allows a plurality of display parameters to be modified by a user. The display parameters include a lower display level and an upper display level. The lower display level and the upper display level define bounds between which the level of the liquid contained in the tank is displayed. The user interface 50 can include an input device such as a series of buttons, a keyboard, a mouse, a joystick, a lightpen, a trackball, or a touchpad, to name a few, to allow the user to modify the display parameters.

The system further comprises a processor 52 which communicates with the sensing device 30 and the user interface 50. The processor 52 scales the level of the liquid measured by the sensing device 30 in dependence upon the lower display level and the upper display level provided by the user interface 50. Preferably, the sensing device 30 is coupled to the processor 52 by a sensor interface 54. Most preferably, the sensor interface 54 is capable of accepting different types of signals produced by different types of sensing devices available for sensing a liquid level. For example, some sensing devices produce signals which vary between 1 and 6 volts DC, whereas other sensing devices produce signals which vary between 0 and 10 volts DC. Further, some sensing devices produce current-based signals, such as a pressure transducer which produces a 4 to 20 milliamp output.

The processor 52 can have a digital implementation using, for example, a microprocessor and a memory, wherein the microprocessor performs a sequence of programmed steps. Alternatively, the processor 52 can have an analog implementation using standard means for performing analog computations.

The system further comprises a display 56 which communicates with the processor 52. The display 56 graphically displays the level of the liquid scaled in dependence upon the lower display level and the upper display level. Preferably, the display 56 provides a graphical bar-chart display of the level of the liquid, although other graphical display formats can be employed. The display 56 can be embodied by light-emitting diodes, liquid crystal displays, a cathode ray tube, a plasma panel, a direct view storage tube, an electroluminescent display, or lamps to name a few alternatives.

Optionally, the processor 52 is further coupled to one or more actuators 60 which perform an action based upon the sensed level of the liquid. The action, such as controlling a sump-pump, a pump, or a valve, or activating an alarm, is performed in order to regulate the level of the liquid.

Figure 4:
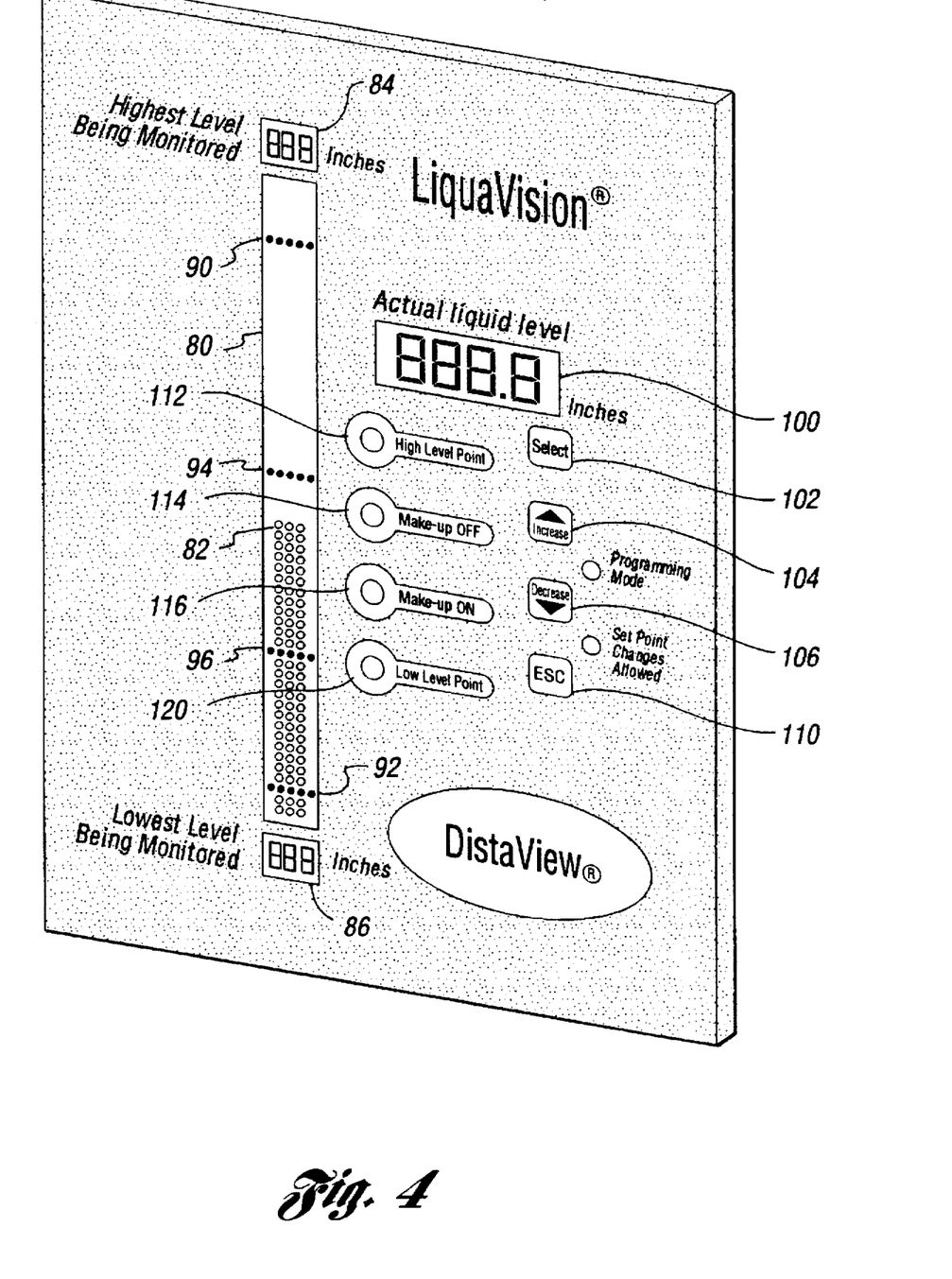
FIG. 4 illustrates an embodiment of a user interface and a display in accordance with embodiments of the present invention.

FIG. 4 illustrates an embodiment of the user interface 50 and the display 56 in accordance with embodiments of the present invention. A first display region 80 includes an array of display elements 82. Preferably, the display elements 82 utilize light-emitting diodes, although other types of display elements can be employed. As illustrated, the first display region 80 provides a vertically-oriented bar chart display of the level of the liquid contained within the tank.

A numerical display 84 is located proximate to an upper portion of the display region 80. The numerical display 84 numerically displays the upper display level. In a similar manner, a numerical display 86 is located proximate to a lower portion of the display region 80. The numerical display 86 numerically displays the lower display level. In a preferred embodiment, each of the numerical displays 84 and 86 comprise three seven-segment displays. Each of the seven-segment displays can be embodied by a seven-segment light-emitting diode display.

The display region 80 further graphically displays an upper level set point 90, a lower level set point 92, a make-up off set point 94, and a make-up on set point 96. Preferably, the level of the liquid is displayed graphically in a predetermined color, and the graphical displays of the upper level set point 90, the lower level set point 92, the make-up off set point 94, and the make-up on set point 96 are displayed in corresponding colors which are distinguishable with regard to the predetermined color for the liquid level. For example, the liquid level can be displayed in green, the upper level set point 90 and the lower level set point 92 can be displayed in red, the make-up off set point 94 can be displayed in yellow, and the make-up on set point 96 can be displayed in orange.

The above-mentioned set points are employed by the processor 52 in FIG. 2 for controlling the actuators 60. More specifically, when the level of the liquid exceeds the upper level set point, a corresponding actuator is activated in order to provide a high level alarm. Similarly, when the level of the liquid drops below the lower level set point, a corresponding actuator is activated to provide a low level alarm. When the level of the liquid falls below the make-up on set point, a corresponding actuator is activated and remains activated until the level reaches the make-up off set point.

Still referring to FIG. 4, a numerical display 100 is further included in the system. The numerical display 100 numerically displays the measured level of the liquid. The level of the liquid is displayed in at least one unit of measure, such as inches or centimeters. If desired, the level may be simultaneously displayed in multiple units of measure. In a preferred embodiment, the numerical display 100 includes four seven-segment displays, wherein the seven-segment displays can include seven-segment light-emitting diodes.

The user interface 50 in this embodiment includes a SELECT button 102 which allows a user to select one of the parameters to be modified. These parameters include display parameters such as the upper display level and the lower display level, and set point parameters such as the upper level set point 90, the lower level set point 92, the make-up off set point 94, and the make-up on set point 96.

Further included is an INCREASE button 104 which allow the user to increment the selected one of the parameters, and a DECREASE button 106 which allows the user to decrement the selected one of the parameters. Preferably, the INCREASE button 104 and the DECREASE button 106 increase the rate of change of the selected one of the parameters by holding down the respective button. An ESCAPE button 110 is included which returns the unit to a standard operating mode upon being depressed. Preferably, the set points will continue to cycle until the ESCAPE button 110 is pressed or if none of the buttons are pressed for a predetermined amount of time. In a preferred embodiment, this predetermined amount of time is 2 minutes. Further, the buttons 102, 104, 106 and 110 are preferably embodied by four membrane buttons.

In order to display which of the parameters is currently selected, four visual indicators 112, 114, 116 and 120, are provided. Specifically, the first visual indicator 112 corresponds to the upper level set point, the second visual indicator 114 corresponds to the make-up off set point, the third visual indicator 116 corresponds to the make-up on set point, and the fourth indicator 120 corresponds to the lower level set point. The visual indicators 112, 114, 116 and 120 can be embodied by light-emitting diodes, lamps, liquid crystals, or a like alternative. Upon selecting a parameter, the numerical display 100 preferably provides a numerical display of the value of the selected parameter.

An alternative method for modifying the make-up on set point and the make-up off set point is as follows. A single, programmable set point is employed to shift both the make-up on set point and the make-up off set point. The make-up on set point and make-up off set point form a window whose location is modified based upon the single set point.

Figure 5:
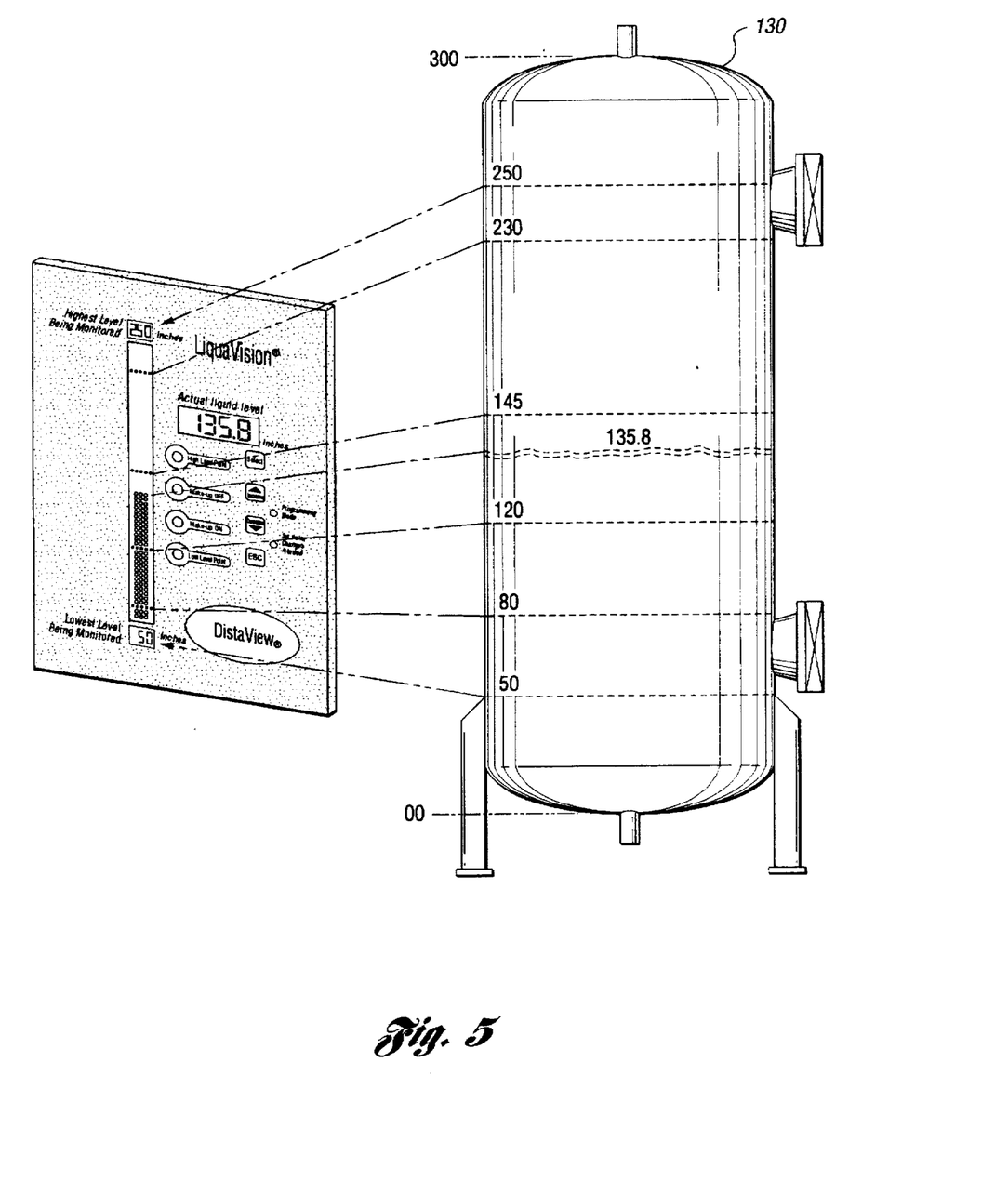
FIG. 5 is an illustration of how an embodiment of the present invention can be used.

FIG. 5 illustrates an example of how an embodiment of the present invention can be used. The system is employed for use with a 300 inch tall tank 130. In this example, the lower display level is set to 50 inches and the upper display level is set to 250 inches. The upper level set point is programmed to be 230 inches, so that an alarm is activated when the actual level rises above 230 inches. The lower level set point is programmed to be at 80 inches. As a result, a low level alarm is activated when the actual level falls below 80 inches. The make-up on set point is set to be 120 inches and the make-up off is set to be 145 inches. As the liquid level falls below 120 inches, the make-up is turned on and stays on until the level fills up to 145 inches. Consequently, in this example, the desired operating level is to be maintained between 120 and 145 inches of liquid.

Figure 6:
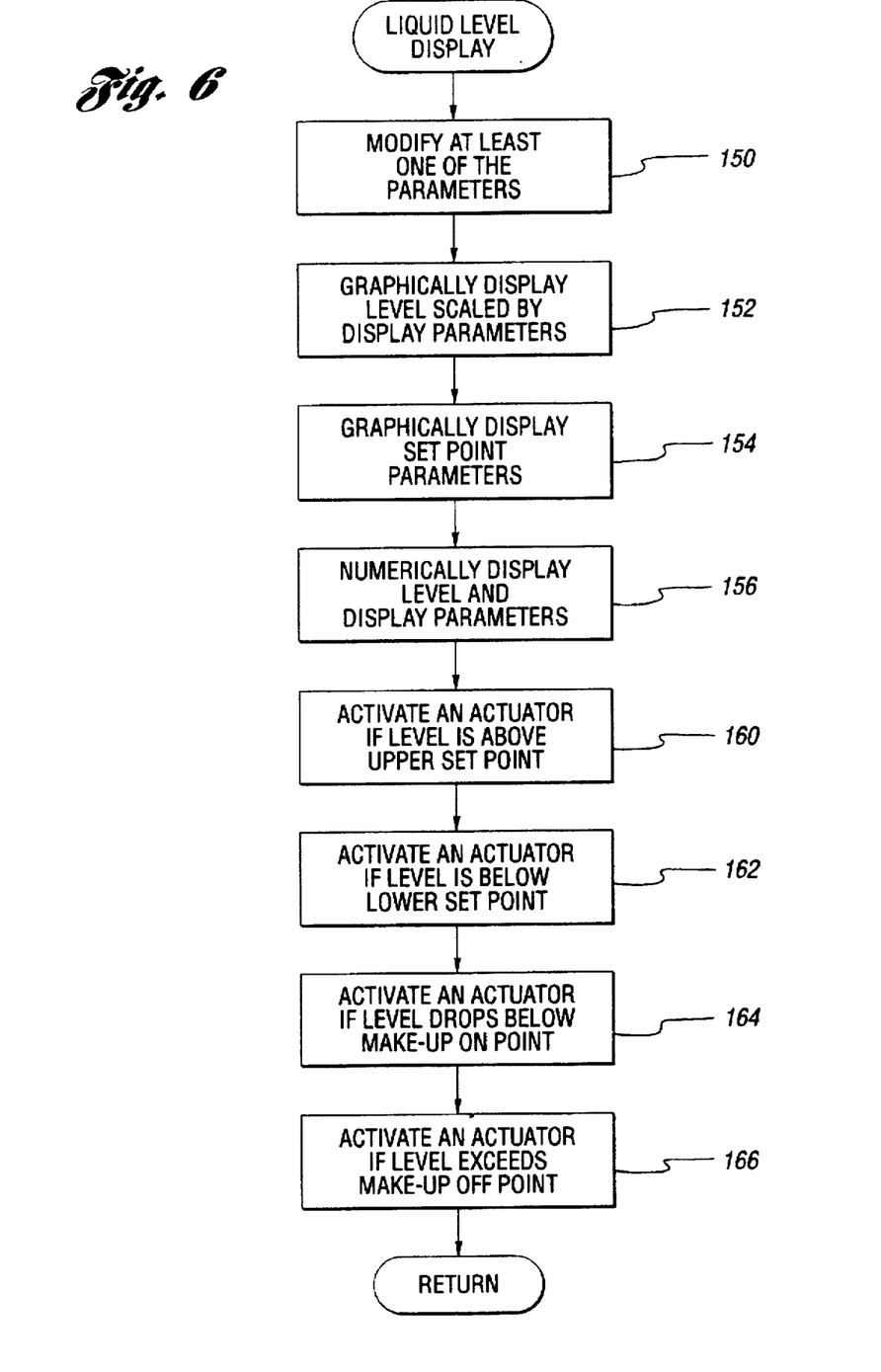
FIG. 6 is a flow chart of another embodiment of a method of displaying a level of a liquid contained in a tank.

FIG. 6 is a flow chart of another embodiment of a method of displaying a level of a liquid contained within a tank. The method of displaying the level is used in conjunction with a sensing device capable of measuring the level of the liquid. The method comprises a step of modifying at least one of a plurality of parameters, as indicated by block 150. The parameters include display parameters such as a lower display level and an upper display level, and set point parameters such as an upper level set point, a lower level set point, a make-up off set point, and a make-up on set point.

The method further comprises a step of graphically displaying the level of the liquid scaled in dependence upon the display parameters, as indicated by block 152. Preferably, the level of the liquid is scaled in dependence upon the lower display level and the upper display level wherein the level is linearly interpolated between the upper and lower display levels. Further, the step of graphically displaying the level preferably produces a vertically-oriented bar chart display of the level of the liquid.

As indicated by block 154, the method further comprises a step of graphically displaying the set point parameters. Preferably, the set point parameters are incorporated in the graphical bar chart display of the level of the liquid. Specifically, the level of the liquid can be displayed in a predetermined color, and the set point parameters can be displayed in corresponding colors which are distinguishable with respect to the predetermined color.

As indicated by block 156, the method further comprises a step of numerically displaying the measured level of the liquid and numerically displaying at least one of the display parameters. Preferably, the display parameters which are numerically displayed include the upper display level and the lower display level. More preferably, the upper display level is numerically displayed in proximity to an upper portion of the bar chart display, and the lower display level is numerically displayed in proximity to a lower portion of the bar chart.

The method further comprises a step of activating an actuator if the level is above an upper level set point, as indicated by block 160. As indicated by block 162, the method includes a step of activating an actuator if the level falls below a lower level set point. The method also includes a step of activating an actuator if the level drops below a make-up on set point, as indicated by block 164. As indicated by block 166, the method includes a step of deactivating an actuator if the level rises above the make-up off set point. The steps indicated by blocks 160, 162, 164, and 166 are used to control the level of the liquid between the make-up on and the make-up off set points, and to provide alarms if the level is outside of a range defined by the lower level set point and the upper level set point.

Figure 7A:
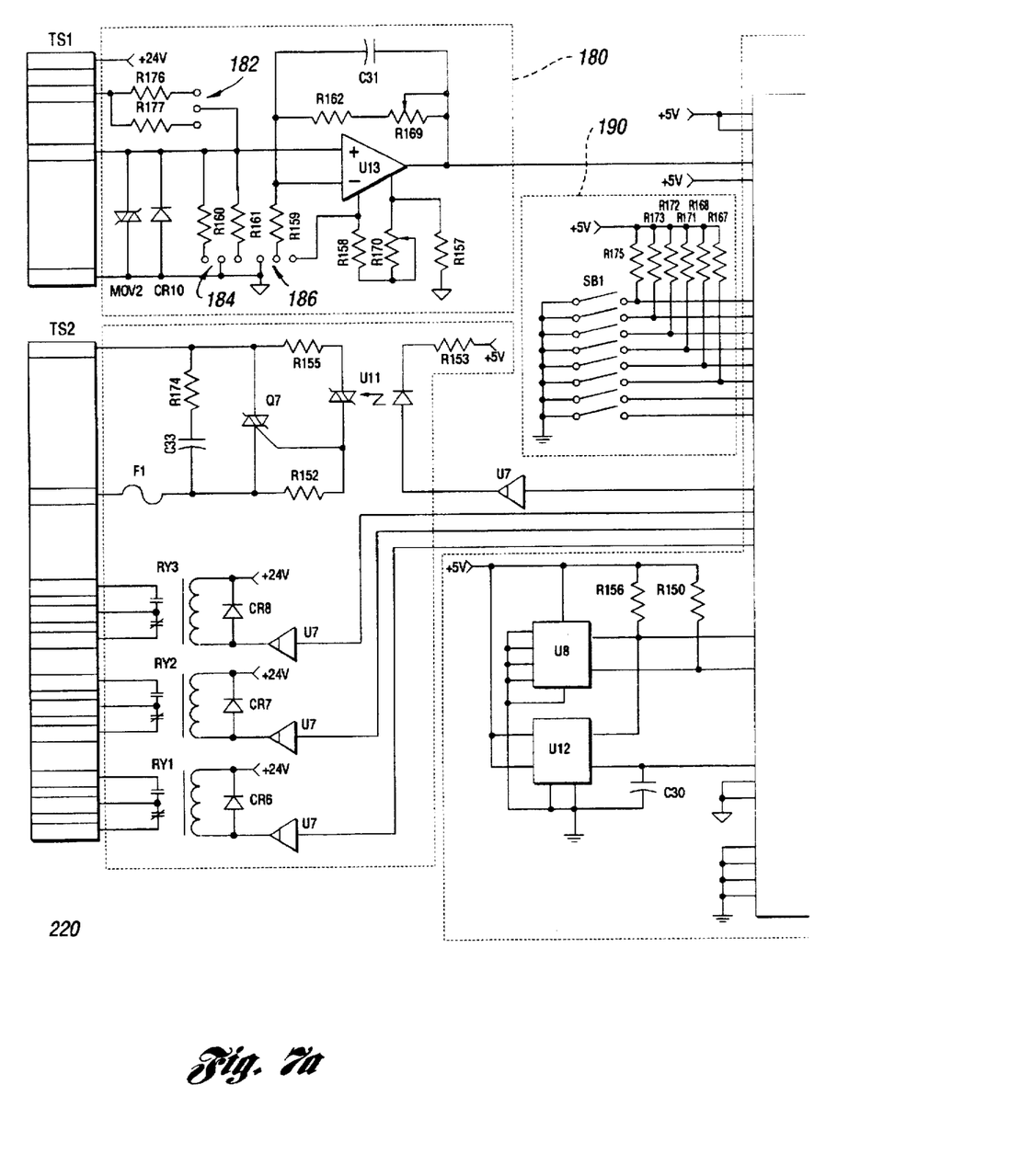
Figure 7B:
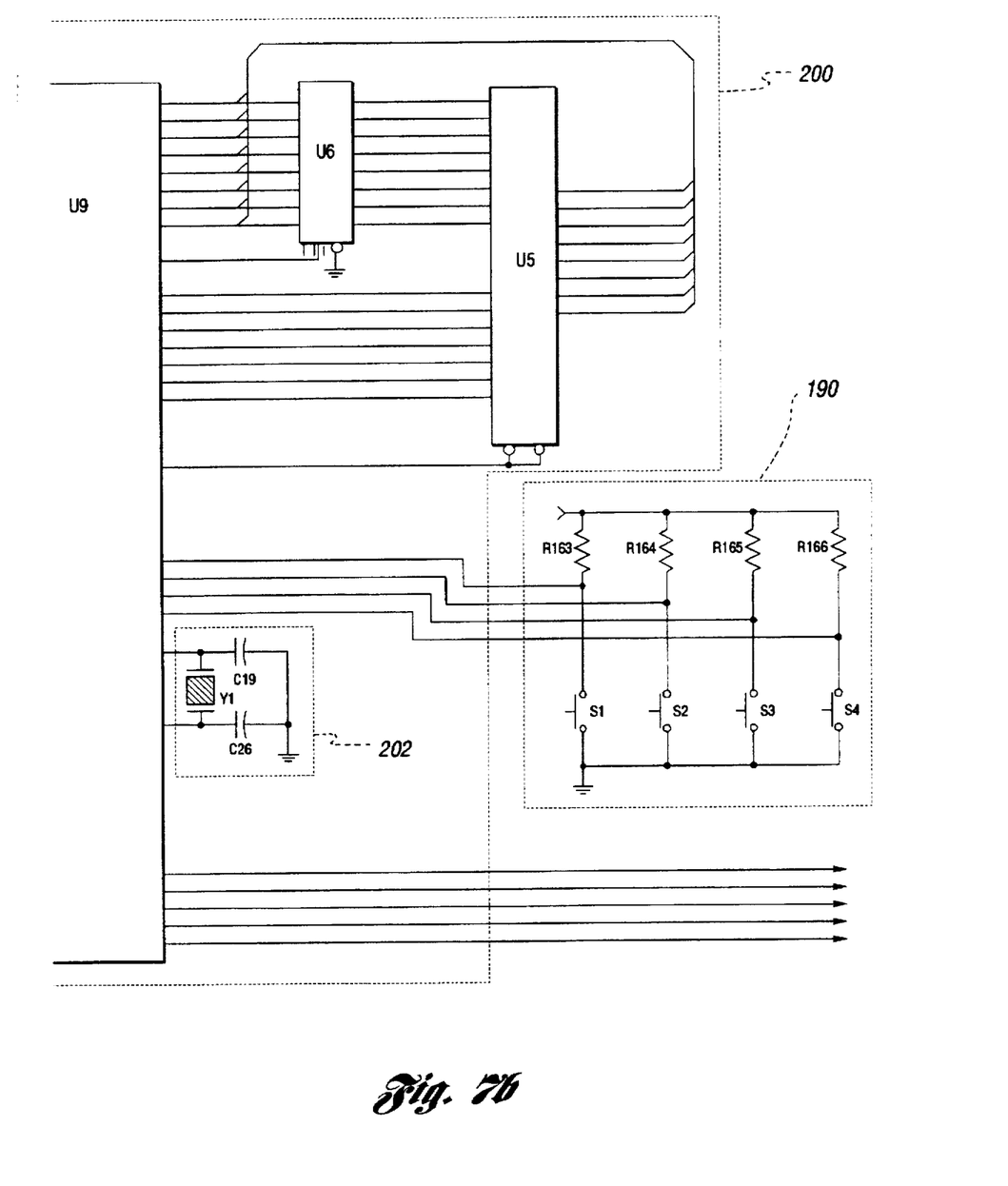
Figure 7C:
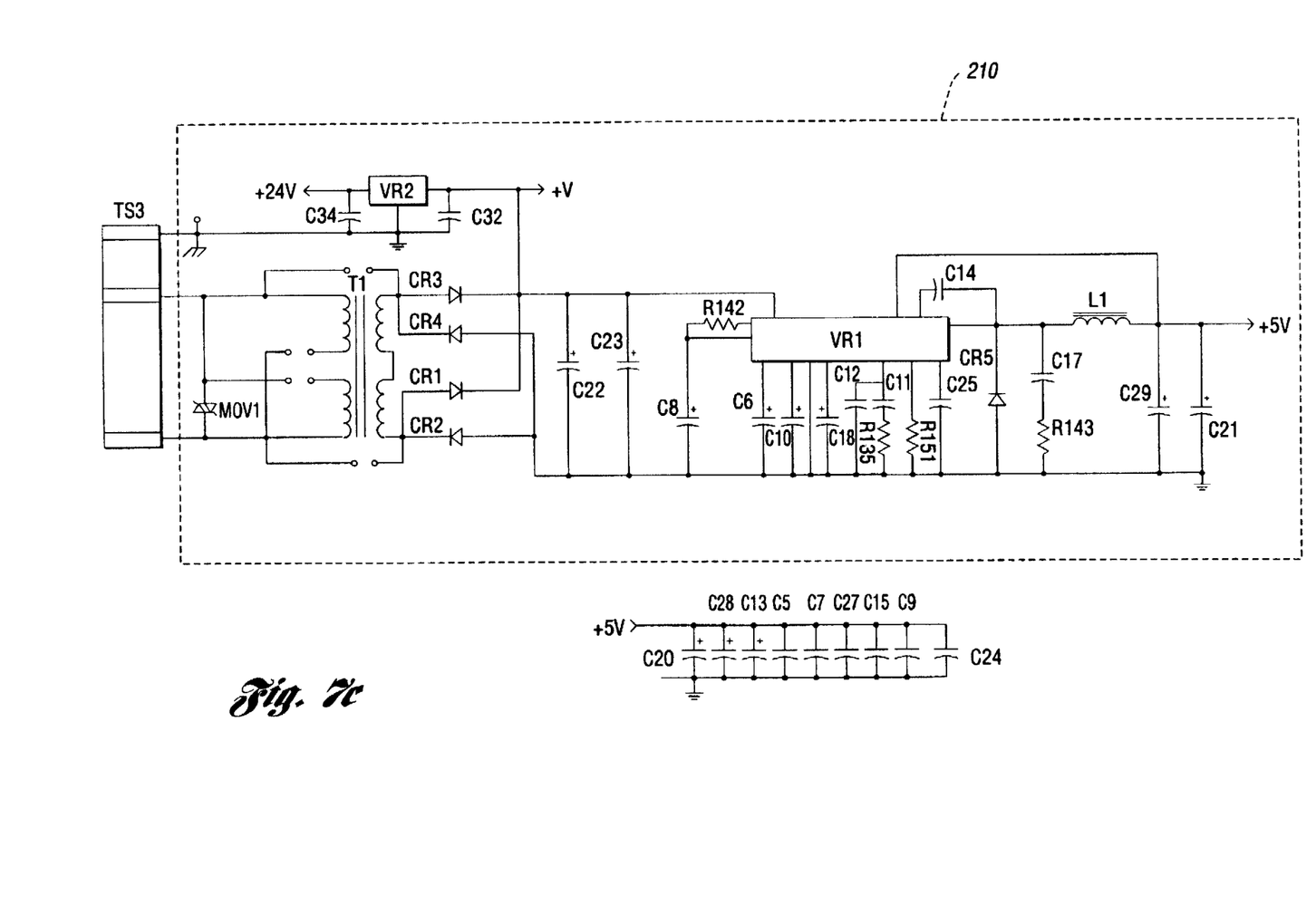

FIG. 7(a–c) is a schematic drawing of an embodiment of a system in accordance with the present invention. The system includes a sensor interface 180 having inputs connected to a terminal strip TS1. The sensor interface 180 includes an amplifier U13, a diode CR10, a bidirectional diode MOV2, a capacitor C31, and resistors R157, R158, R159, R160, R161, R162, R169, R170, R176, and R177. Further included are three hardware selectable connections 182, 184, and 186. These connections 182, 184 and 186 are used for modifying the configuration of the sensor interface 180 based upon the type of sensing device used therewith.

The system further includes a user interface 190 which allows the display parameters and the set point parameters to be modified by a user. The user interface 190 is comprised of switches S1, S2, S3 and S4, and resistors R163, R164, R165 and R166. Further included in the user interface 190 is an eight-position dipswitch SB1 connected to six resistors R167, R168, R171, R172, R173 and R175. The dipswitch SB1 is employed to provide a user with different security levels. In a preferred embodiment, the security levels include a programming mode, a set point changes allowed mode, and a view mode. The programming mode allows a user to modify the display parameters as well as the set point parameters. The set point changes allowed mode allows a user to modify only the set point parameters. The view mode allows the set point parameters to be viewed but not altered.

Both the sensor interface 180 and the user interface 190 communicate with a processor 200. The processor comprises a microprocessor U9, a buffer U6, and a memory U5. The buffer U6 is embodied by an octal three-state latch. The memory U5, embodied by an ultraviolet EPROM, contains a stored program which dictates scaling steps and relay actuation steps performed by the microprocessor U9.

The processor 200 further contains a clock circuit 202 which provides a clock signal to the microprocessor U9. In the illustrated embodiment, the clock circuit 202 includes a crystal Y1, and capacitors C19 and C26. In this embodiment, the clock circuit produces an 8 MHz clock signal.

Further included in the processor 200 is a CPU supervisor integrated circuit U12. The supervisor U12 is coupled to the microprocessor U9 for the purpose of protecting the microprocessor-based processor 200. Specifically, the supervisor U12 monitors a supply voltage for the microprocessor U9, and adds a watchdog timer to monitor software execution. The supervisor U12 is capable of resetting the system when a problem is detected.

Also included in the processor 200 is a serial EEPROM U8 coupled to the microprocessor U9. The serial EEPROM U8 is used to store the display parameters and the set point parameters if power is removed from the microprocessor U9.

The system is powered by an alternating current source applied to a terminal strip TS3. The terminal strip TS3 is coupled to a power supply 210. The power supply 210 provides a 24 volt DC voltage source and a 5 volt DC voltage source.

More specifically, the alternating current source is applied to a combination of a transformer T1 and diodes CR1, CR2, CR3, and CR4 to provide a rectified signal. Further, a bidirectional diode MOV1 is included to protect the power supply 210 from voltage transients in the alternating current supply. The rectified signal is applied to a combination of a voltage regulator VR2 and capacitors C32 and C34 to provide the 24 volt DC voltage source. The rectified signal is also applied to a combination including a voltage regulator VR1, capacitors C6, C8, C10, C11, C12, C14, C17, C18, C21, C22, C23, and C25, resistors R135, R142, R151, and inductor L1 to provide the 5 volts DC voltage source. The 5 volt DC voltage supply is further filtered by parallel capacitors C20, C28, C13, C5, C7, C27, C15, C9, and C24.

The system further includes a set of actuators 220 used to produce an action based upon the level of the liquid. Specifically, actuating signals generated by the processor 200 are received by four buffers U7. The outputs of three of these buffers are applied to corresponding relays RY1, RY2, and RY3. Each of the relays RY1, RY2 and RY3 have a corresponding one of diodes CR6, CR7 and CR8 coupled across its corresponding input terminals. The outputs of the relays RY1, RY2 and RY3 are applied to a terminal strip TS2.

In practice, the relays RY1, RY2, and RY3 are employed for the purpose of providing a high level alarm, a low level alarm, and a make-up signal. The relays RY1, RY2 and RY3 can be interfaced to a programmable logic controller or to relay panels via the terminal strip TS2.

Further included within the actuators 220 is a solid state relay output for use with a make-up solenoid. The solid state output is formed by a combination of an opto-isolator U11, a silicon-controlled rectifier Q7, a capacitor C33, and resistors R152, R153, R155, and R174. Further included is a fuse F1 used to protect the make-up solenoid. The solid state output is used for the purpose of controlling a pump or a sump-pump. Specifically, if the level of the liquid within the tank drops below the make-up on point, the solid state output would actuate a pump in order to add fluid to the tank until the level reaches the make-up off point. Alternatively, with a sump-pump, when liquid is drained to a certain minimum level, a pump will be deactivated so as to prevent motor burn out. However, when the liquid reaches a sufficiently high level, the pump is activated to evacuate unwanted liquid in the sump.

Figure 8A:
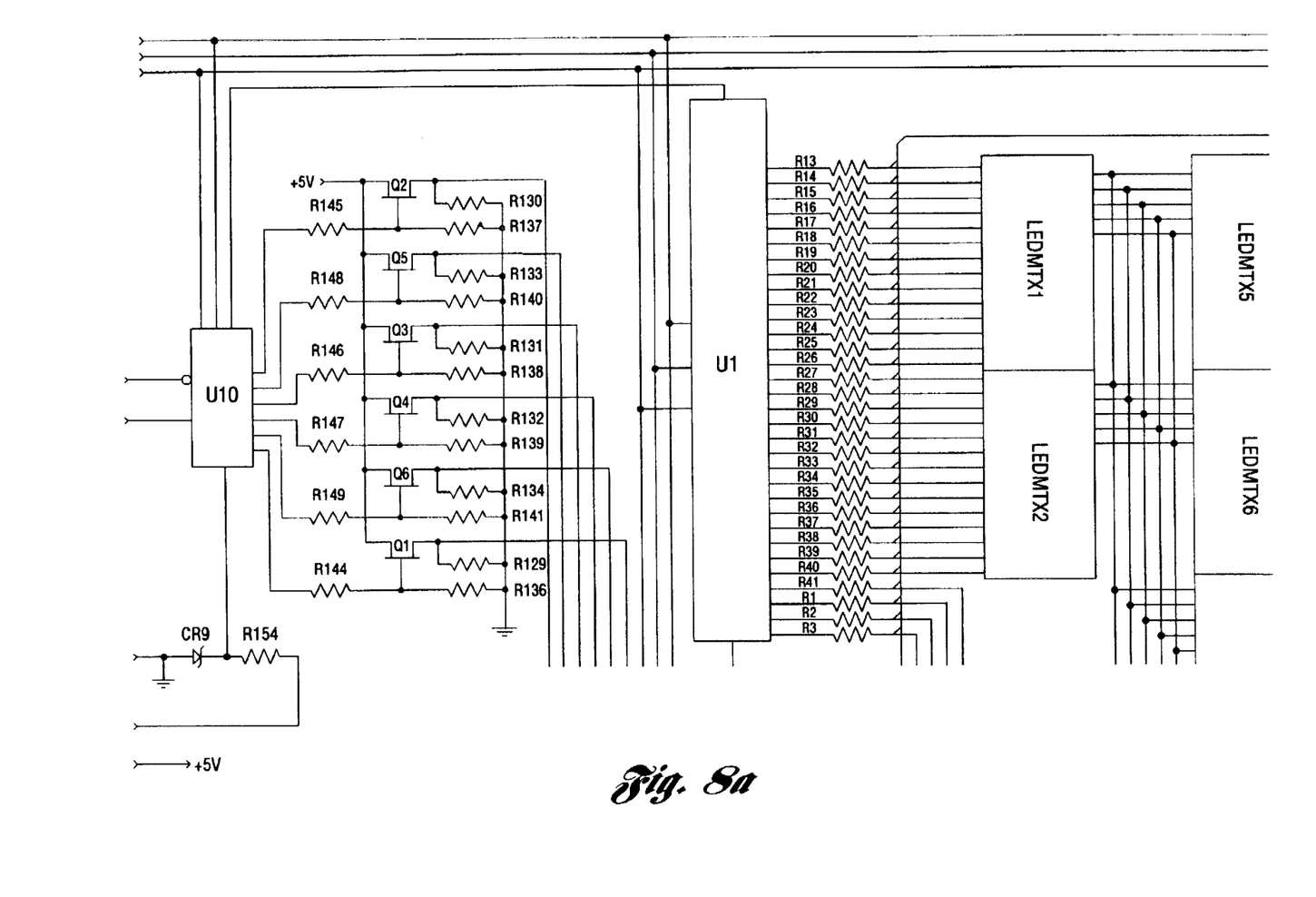
Figure 8B:
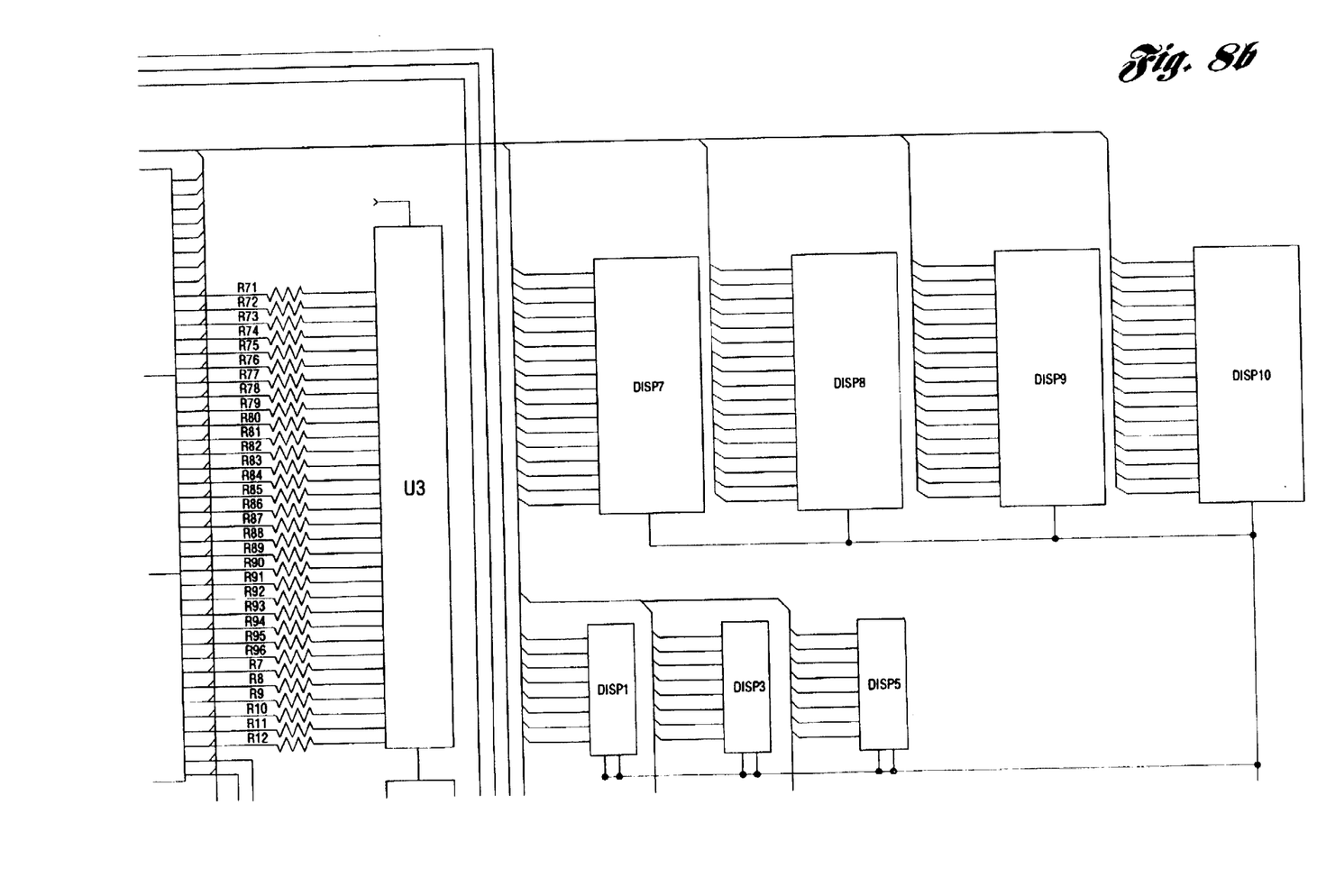
Figure 8C:
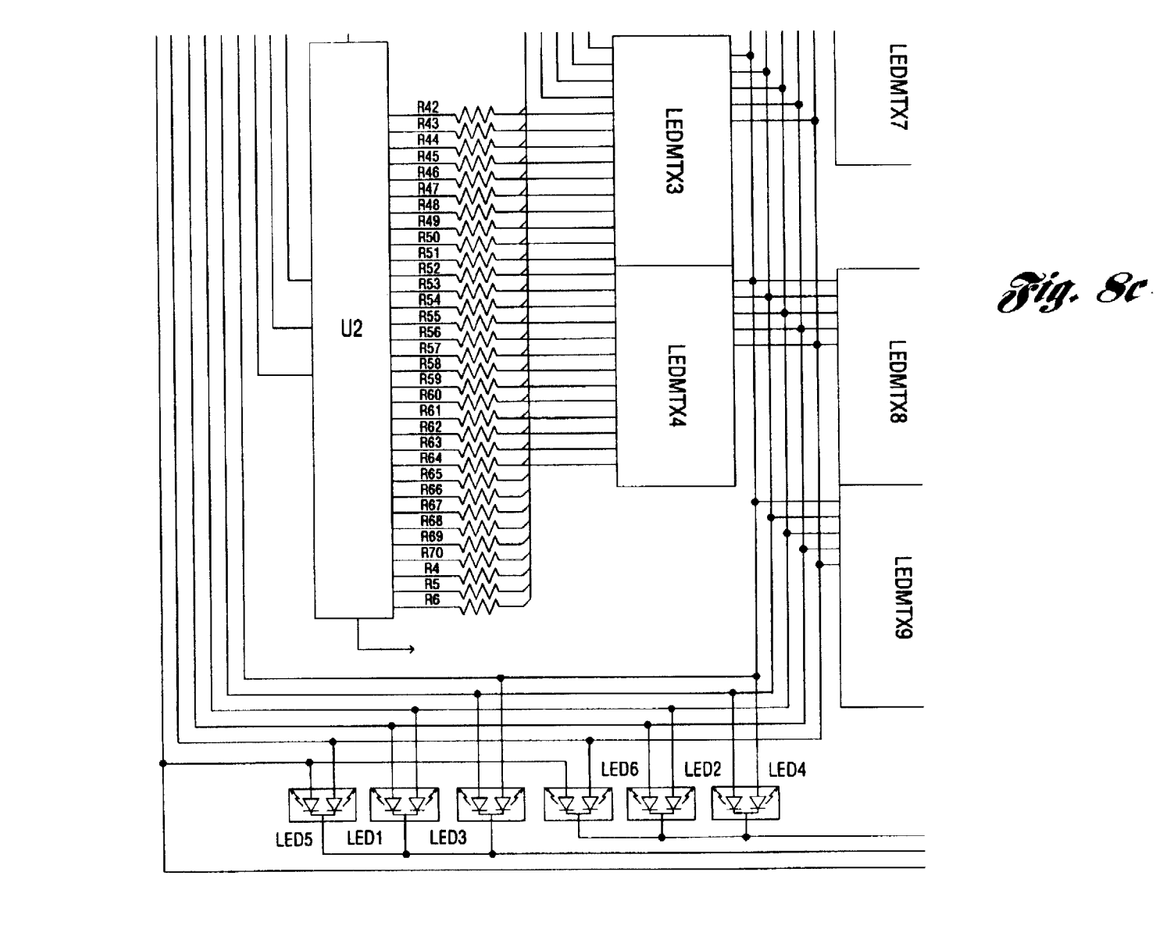

FIG. 8(a-d) is a schematic drawing of an embodiment of a display in accordance with embodiments of the present invention. The display can be coupled to the processor 200 illustrated in FIG. 7. The display includes nine light-emitting diode matrices, LEDMTX1 to LEDMTX9 used to provide an array of display elements. The display elements provided by the light-emitting diode matrices LEDMTX1 to LEDMTX9 are oriented vertically in order to provide a bar chart display of the level of the liquid contained within the tank.

The display also includes three seven-segment light-emitting diode displays DISP1, DISP3, and DISP5. The seven-segment displays DISP1, DISP3, and DISP5 numerically display the lower display level. Preferably, the seven-segment displays DISP1, DISP3, and DISP5 are located proximate to a lower portion of the bar chart display.

The display further includes three seven-segment light-emitting diode displays DISP2, DISP4, and DISP6. The seven-segment displays DISP2, DISP4, and DISP6 provide a numerical display of the upper display level. Preferably, the seven-segment displays DISP2, DISP4, and DISP6 are located proximate to an upper portion of the vertically-oriented bar chart display of the level of the liquid.

Further included in the display are four seven-segment light emitting diodes DISP7, DISP8, DISP9, and DISP10. The seven-segment displays DISP7, DISP8, DISP9, and DISP10 are used to provide a numerical display of the level of the liquid measured. Further, the seven-segment displays DISP7, DISP8, DISP9 and DISP10 can be used to display set point parameters while in a programming mode.

Light-emitting diodes LED5 and LED6 provide visual indicators of the programming mode state, that is, whether or not set point modifications are allowed. Light-emitting LED1, LED2, LED3, and LED4 provide visual indicators which indicate the selected parameter which can be modified by the user. Specifically, LED1 indicates the upper level set point, LED2 indicates the make-up off set point, LED3 indicates the make-up on set point, and LED4 indicates the lower level set point.

A complete parts list of the components illustrated in FIGS. 7 and 8 is given in Table I.

TABLE I

| REF. NO. | PART | DESCRIPTION | QTY |
|---|---|---|---|
| U1-4 | 7739 | UCN5833A | 4 |
| U5 | 7736 | 27C256 | 1 |
| U6 | 7751 | 74HCT573 | 1 |
| U7 | 7748 | UDN2595A | 1 |
| U8 | | X2404 | 1 |
| U9 | | X80C552 | 1 |
| U10 | | UDN5891 | 1 |
| U11 | 7760 | MOC3022 | 1 |
| U12 | 7778 | DALLAS 1232 | 1 |
| U13 | 7767 | LM10 | 1 |
| CR6-4 | 7013 | RL253 | 4 |
| CR5 | 7012 | MBR1045 | 4 |
| CR6-8,10 | 7005 | IN4004 | 4 |
| CR9 | 7009 | IN967B | 1 |
| DISP1-6 | | LTS368HR | 6 |
| DISP7-10 | | LTP-587HR | 4 |
| LEDMTX1-9 | 9306 | LTP-1257AA | 9 |
| LED1-6 | | LTL-52RG | 6 |
| MOV1 | 7298 | MOV. 150V | 1 |
| MOV2 | 7297 | MOV. 12V | 1 |
| Q1-6 | 7569 | BUZZ11 | 6 |
| Q7 | 7570 | SCI46D | 1 |
| VR1 | 7247 | L4970 | 1 |
| VR2 | 7260 | 7824CT | 1 |
| R1-128 | 6219 | RDS2-33 ¼W 5% | 128 |
| R129-134 | 6218 | RDS2-3,3K ¼W 5% | 6 |
| R135 | 6214 | RDS2-15K ¼W 5% | 1 |
| R136-141, 150 156, 163-168, 171, 173, 175 | | | |
| R142 | 6216 | RDS2-22K ¼W 5% | 1 |
| R143-149 | 6213 | RDS2-150 ¼W 5% | 7 |
| R151 | 6221 | RDS2-47K ¼W 5% | 1 |
| R152 | 6229 | RDS2-2.2K ¼W 5% | 1 |
| R153 | 6216 | RDS2-220 ¼W 5% | 1 |
| R154 | 6215 | RDS2-1K ¼W 5% | 1 |
| R155 | 6234 | RDS2-47 ¼W 5% | 1 |
| R157 | | 1K 1% | 1 |
| R158 | | 4.7K ¼W 1% | 1 |
| R159 | | 100K ¼W 1% | 1 |
| R160, 177 | 6065 | 3.01K ¼W 1% | 2 |
| R161 | | SN2CD-150 ¼W 1% | 1 |
| R162 | | 68K ¼W 1% | 1 |
| R169 | | 100K 20 TURN POT | 1 |
| R170 | 6100 | 10K 20 TURN POT | 1 |
| R174 | 6082 | 47 ½W 5% | 1 |
| R176 | 6307 | SN2CD-7 32K ¼W 1% | 1 |
| C1-4 | 6502 | 1MF 25V TANT | 4 |

TABLE I-continued

| REF. NO. | PART | DESCRIPTION | QTY |
| --- | --- | --- | --- |
| C5, 7, 9, 14–16, 27, 30, 31 | 6509 | 1MF 50V | 9 |
| C6, 8 | 6515 | 22MF 35V | 2 |
| C10, 13, 18, 34 | 6516 | 2.2MF 35V | 4 |
| C11 | 6594 | .047MF | 1 |
| C12 | 6514 | 150PF | 1 |
| C17 | 6512 | .01MF 50V | 1 |
| C19, 26 | 6570 | 15PF MICA | 2 |
| C20, 24, 28 | | 100MF 6V | 3 |
| C21, 29 | 6589 | 1000MF 50V | 2 |
| C22, 23 | | 2200MF 50V | 2 |
| C25 | 6511 | .001MF | 1 |
| C32 | | 2.2MF 50V | 1 |
| C33 | 6582 | .1MF 400V | 1 |
| HS1 | 8723 | HEATSINK. 346-1PP | 1 |
| HS2 | 8722 | HEATSINK. 273AB | 1 |
| S1–4 | 8000 | PB.C&K KS11 | 4 |
| SB1 | 8004 | 8 POS DIP SWITCH | 1 |
| F1 | | FUSE | 1 |
| F15 | 9013 | FUSE HOLDER | 1 |
| T1 | | TRANSFORMER, PSO724 | 1 |
| L1 | 9210 | TOROID, P5234 | 1 |
| RY1–3 | | RELAYS, G5V-2-DC24 | 3 |
| Y1 | 8704 | CRYSTAL, 8.000MHZ | 1 |
| U55 | 8602 | SOCKET, 28 PIN DIP | 1 |
| U85 | 8608 | SOCKET, 8 PIN DIP | 1 |
| U95 | 8609 | SOCKET, 68 PIN PLCC | 1 |
| TS1 | | TERMINAL STRIP, 4 PIN | 1 |
| TS2 | | TERMINAL STRIP, 11 PIN | 1 |
| TS3 | | TERMINAL STRIP, 3 PIN | 1 |
| | 6000 | PC1 PCB | 1 |

Although the aforementioned embodiments of the present invention have been presented in the context of the level of liquid in a tank, alternative embodiments can be employed for displaying and controlling an amount of material in a container. The types of material can include liquids, solids, or gas. For example, the material can include steel chips, coal, flour, etc. Further, alternative embodiments may include a display of another measure of the amount of material in the container. For example, a measure of the volume of the material may be included.

The previously described embodiments of the present invention have many advantages. By employing the described embodiments of the sensor interface, the resulting display system can be employed with many types of sensing devices. A further advantage is provided by the scaleable bar graph display of the level of the liquid. A user is capable of modifying display parameters such as an upper display and a lower display level so that only a window of the entire range is displayed. Further, the values of set point parameters are visually displayed on the scaled bar graph. Also, the actual measured level of the fluid is displayed numerically.

While the best mode for carrying out the invention has been described in detail, those familiar with the art to which this invention relates will recognize various alternative designs and embodiments for practicing the invention as defined by the following claims.

What is claimed is:

1. A system for displaying a level of a liquid contained in a tank, the level of the liquid measured using a sensing device, the system comprising:

a user interface which allows a plurality of display parameters to be modified, wherein the display parameters include a lower display level and an upper display level which are selectively adjustable;

a processor, in communication with the sensing device and the user interface, which scales the level of the liquid in dependence upon the lower display level and the upper display level, wherein the level of the liquid is linearly interpolated between the lower and upper display levels to increase display sensitivity; and a first display, in communication with the processor, which graphically displays a bar-chart display of the level of the liquid scaled in dependence upon the lower display level and the upper display level.

2. The system of claim 1 further comprising a second display which numerically displays the level of the liquid.

3. The system of claim 1 wherein the interface further allows a lower level set point and an upper level set point to be modified.

4. The system of claim 1 wherein the first display further graphically displays the lower level set point and the upper level set point.

5. The system of claim 4 wherein the first display graphically displays the level of liquid in a predetermined color, and graphically displays the lower level set point and the upper level set point in corresponding colors which are distinguishable with regard to the predetermined color.

6. The system of claim 4 further comprising an actuator which is activated when the level of the liquid exceeds the upper level set point.

7. The system of claim 4 further comprising an actuator which is activated when the level of the liquid drops below the lower level set point.

8. The system of claim 1 wherein the interface further allows a first set point and a second set point to be modified.

9. The system of claim 8 wherein the first display graphically displays the level of liquid in a predetermined color, and graphically displays the first set point and the second set point in corresponding colors which are distinguishable with regard to the predetermined color.

10. The system of claim 8 further comprising an actuator is activated when the level of the liquid drops below the first set point and deactivated when the level of the liquid exceeds the second set point for maintaining the level of liquid between the first and second set points.

11. The system of claim 1 further comprising a sensor interface which couples the sensing device to the processor.

12. A system for displaying and controlling a level of a liquid contained in a tank, the level of the liquid measured using a sensing device, the system comprising:

a user interface which allows a plurality of parameters to be modified, wherein the parameters include a lower display level, an upper display level, a first level set point, a second level set point, a third level set point, and a fourth level set point;

a sensor interface which couples the sensing device to the processor, the sensor interface capable of accepting at least one of a plurality of different signal types for the sensing device;

a processor, in communication with the sensor interface and the user interface, which scales the level in dependence upon the lower display level and the upper display level, wherein the level of the liquid is linearly interpolated between the lower and upper display levels to increase display sensitivity;

a first display, in communication with the processor, which provides a vertically oriented, graphical bar-chart display of the level of the liquid scaled in dependence upon the lower display level and the upper display level, wherein the graphical bar-chart display of the level is in a predetermined color, the first display further graphically displaying the first, second, third, and fourth level set points in corresponding colors distinguishable with regard to the predetermined color;

a second display, in communication with the processor, which numerically displays the level of the liquid;

a third display, in communication with the processor and located proximate to an upper portion of the first display, which numerically displays the upper display level;

a fourth display, in communication with the processor and located proximate to a lower portion of the first display, which numerically displays the lower display level;

a first actuator, in communication with the processor, which is activated when the level of the liquid exceeds the first level set point;

a second actuator, in communication with the processor, which is activated when the level of the liquid drops below the second level set point; and a third actuator, in communication with the processor, which is activated when the level of the liquid drops below the third level set point and is deactivated when the level of the liquid exceeds the fourth level set point for maintaining the level of liquid between the third and fourth level set points.

13. A method of displaying a level of a liquid contained in a tank, the level of the liquid measured using a sensing device, the method comprising:

modifying at least one of a plurality of display parameters, wherein the display parameters include a lower display level and an upper display level; and graphically displaying a bar chart display of the level of the liquid scaled in dependence upon the lower display level and the upper display level, wherein the level of the liquid is linearly interpolated between the lower and upper display levels to increase display sensitivity.

14. The method of claim 13 further comprising modifying at least one of a plurality of set point parameters.

15. The method of claim 14 further comprising graphically displaying each of the set point parameters.

16. The method of claim 14 further comprising activating an actuator in dependence upon the level in relation to the set point parameters.

* * * * *